O. C. REEVES.
WEIGHING SCALE.
APPLICATION FILED SEPT. 3, 1909.
999,339.
Patented Aug. 1, 1911.
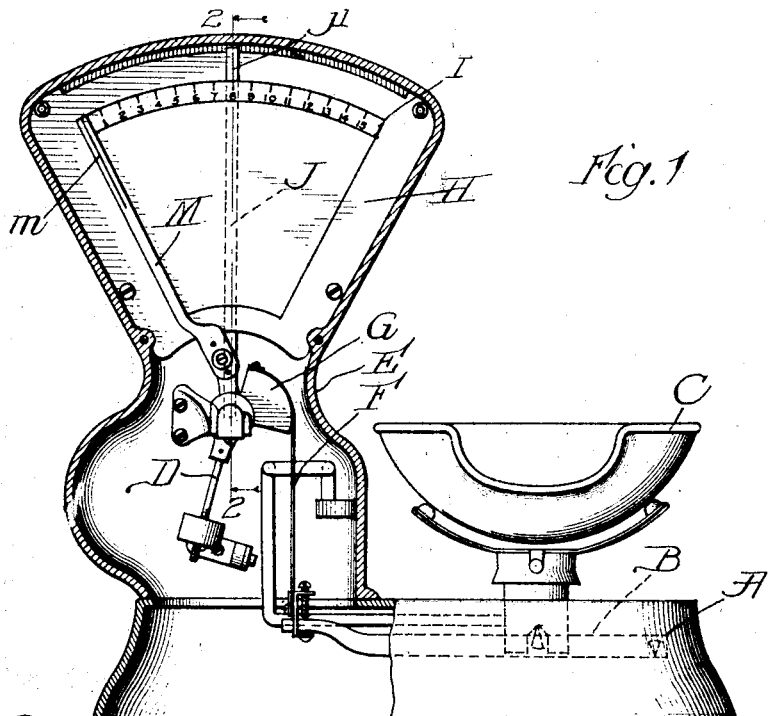
Fig. 1
Fig. 3
Fig. 2
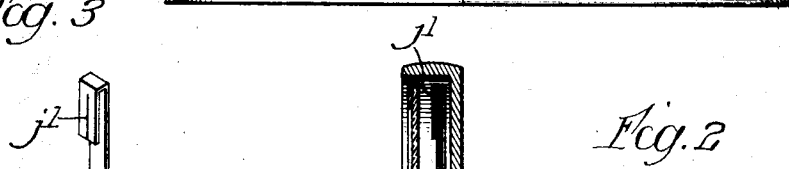
Witnesses:
H. G. Barrett
Louis B. Erwin
Inventor:
Orwell C. Reeves
By Rector, Hibben & Davis
His Attys

UNITED STATES PATENT OFFICE.

OREVELL C. REEVES, OF TOLEDO, OHIO, ASSIGNOR TO TOLEDO COMPUTING SCALE COMPANY, OF TOLEDO, OHIO, A CORPORATION OF NEW JERSEY.

WEIGHING-SCALE.

999,339. Specification of Letters Patent. Patented Aug. 1, 1911.

Application filed September 3, 1909. Serial No. 516,125.

*To all whom it may concern:*

Be it known that I, OREVELL C. REEVES, a citizen of the United States, residing at Toledo, in the county of Lucas and State of Ohio, have invented certain new and useful Improvements in Weighing-Scales, of which the following is a specification.

The present invention relates to an equipment for weighing scales which will facilitate the uniform weighing of goods in instances where a certain exact amount of weight is established and successive quantities of goods or packages containing goods are required to have just this weight, as for example in handling tobacco according to government regulation in the matter of correct weight as related to the internal revenue tax. This sort of weighing has ordinarily been done on even-balance scales the operation of which is necessarily slow as compared with the operation of scales which automatically denote weight upon the placing of goods thereon. In the use of the automatic scale, however, there would ordinarily be no assurance that the operator was uniformly weighing the goods or observing the established weight as it would be left to him to carry in mind this established weight which might very well run to fractions and so in repeatedly noting registrations of the indicating mechanism (which necessarily would comprise relatively movable parts, one having rather fine graduations,) mistakes would be very likely to occur and furthermore there might be either lack of uniformity in weighing or uniform under or overweight from design on the part of the operator.

The object of the present invention is to so equip an automatic scale as to insure uniform and correct weighing when the scale is in use for such purpose as above mentioned, the operator not being called upon to note weight graduations at all but merely the registering of a single mark with another, one being, *e. g.* on a movable part of the weighing apparatus and the other on a member adjusted by some person in authority who holds the key, by which to regulate the adjustment. Thus the foreman of the room in which weighing was done would establish the proper adjustment by the use of his key and all the operator would be called upon to do would be to weigh to this adjustment and it would be out of his power to change the adjustment.

In the drawings which accompany and form part of this specification Figure 1 represents in front elevation a scale of a well-known type equipped to carry out the present invention, a portion of the inclosing casing or housing of the scale being represented in section; Fig. 2 is a vertical cross-section taken on line 2—2 of Fig. 1; and Fig. 3 illustrates in perspective a part belonging to the equipment provided by the present invention.

The type of weighing scale here shown is that known on the market as the Toledo and disclosed in numerous prior patents of which it will suffice to mention De Vilbiss Reissue No. 12,137 of July 28, 1903. The scale comprises the supporting base A in which is fulcrumed a weighing beam B supporting a goods receiver here shown in the form of a scoop C; a pendulum D fulcrumed in a housing E erected on the base A and connected to the beam B by a strap F overlying and secured to an eccentric disk G on the pendulum hub. The upper portion of the housing E is fan-shaped and there is secured against its rear side a plate H on which is inscribed a segmental series of weight graduations I here shown in ounces and fractions of ounces. In a scale of this sort as ordinarily constructed such weight graduations coöperate with an index hand or pointer secured to the pendulum hub or journal and the weighing is done by simply placing goods in the scoop or pan or on a platform and noting the weight graduation with which such pointer registers or most nearly registers when the vibration ceases, means being ordinarily provided such as a dash pot to lessen vibration. In carrying out the present invention the purpose is not to so employ the weight graduations, but they are used merely as a means of adjusting an auxiliary indicating device. This is here shown in the form of an arm J extending upwardly within the housing E behind the plate H and being bent over the top edge of said plate as shown in Fig. 2 and then down in front of the same to the line of weight graduations as shown in Figs. 1 and 2. Upon this front downwardly extending portion $j$ of said arm is a mark $j'$ running to the bottom edge and adapted to register with any one of the graduations I. The lower end of the arm J is fixedly secured as by a screw $j^2$ to a stub shaft or rotary plug J' journaled in a barrel K secured in the rear side of the housing as shown in Fig. 2. The outer end of the plug J' is formed to receive the bits of a key L, the latter adapted to be inserted through the cross slot $k$ of a disk K' loosely mounted in the barrel K and confined against the shoulder thereof by a flange $k'$ of the barrel. It will be seen that by inserting the key through the slot and turning it until the bits register with the correspondingly formed outer end of the plug J' and then thrusting the key farther inward it will be engaged with the plug so as to rotate the latter and thereby the arm J. Thus the foreman or other person in authority who carries the key can adjust the said arm to cause its mark $j$ to register with any desired graduation of the segmental series I, the key being then withdrawn so that the adjustment cannot be tampered with. Of course the plug J' will be journaled in the barrel K with sufficient friction to prevent the arm J from having its adjustment accidentally changed. The front of the housing E is closed, the lower part by a plate E and the upper part by a glass $E^2$ so that the arm cannot be reached from the front.

An index arm or hand M is employed somewhat similar to that heretofore used, said hand being secured to the hub of the pendulum but this hand does not have a pointer as is usually the case. It extends to the outer curved line along which the weight graduations are marked and has a straight or slightly curved end edge and is inscribed with a line $m$ running to such edge and adapted to register with the line or mark $j'$ upon the front portion $j$ of the before-mentioned arm J. When so registering with the arm J the hand M covers the weight graduation with which the mark $j'$ is registering.

It will be obvious that with an arrangement such as above described, the foreman or other person in authority having adjusted the arm J to register its mark $j'$ with a certain weight graduation of the series I, all that is required of the operator is to weigh successive quantities of goods causing the mark $m$ on the arm M to register with said mark $j'$. This insures uniformity in the weighing and observance of the proper weight, putting it beyond the operator to err through not carrying in mind the proper weight or to weigh incorrectly designedly. If his weighings are wrong he cannot make the excuse that he did not have the correct weight in mind. Furthermore, it is out of his power to set the scales for the wrong weight.

While the invention is here shown applied to a certain well-known type of automatic weighing scales, it is to be understood that the invention may be carried out with other types of weighing scales and that it is not limited to the particular type here shown. Neither is it necessary that the precise construction of auxiliary registering means be employed.

What is claimed is:

1. The combination with indicating means of weighing scales comprising relatively movable members one having weight graduations; of an auxiliary indicating device adjustable with reference to such weight graduations and adapted to register with the other member of the first-mentioned indicating means, a rotary plug frictionally held in adjusted position to which the auxiliary indicating device is secured, such auxiliary indicating member being in the form of an arm secured to the rotary plug the latter formed to receive the bits of a key.

2. In weighing scales the combination of movable weighing parts including an oscillating member, a fixed part bearing a segmental series of weight graduations concentric with said oscillating member, an indicating hand secured to the latter and extending across the series of weight graduations, and an arm journaled concentrically with said oscillating member and marked to register with any one of the weight graduations, the said index hand being marked to register with said arm, a rotary plug frictionally held in position to which the arm is secured and which is adapted to receive the bits of the key.

3. In weighing scales the combination of a suitable supporting base and housing, a weighing beam, a goods receiver thereon, an oscillating member connected to said beam, load-counterbalancing means, a plate fixed in the housing and bearing on one side a segmental series of weight graduations, an index hand secured to said oscillating member and extending across the front of said plate over a series of weight graduations, an arm extending in the rear of the plate and having an end portion carried in front of the same to the line of weight graduations thereon, a rotary plug to which said arm is secured, and a barrel secured to the housing and in which said plug is journaled, the latter adapted to be engaged by the bits of a key for turning it and adjusting the arm and the latter having on its front portion a mark to register with any one of the weight graduations and the index hand having a mark to register with that on said arm.

OREVELL C. REEVES.

Witnesses:
ARTHUR STULL,
E. J. SHEFFER.